(12) United States Patent
Kloepper et al.

(10) Patent No.: US 9,188,503 B2
(45) Date of Patent: Nov. 17, 2015

(54) RIGID BODY CHARACTERISTIC IDENTIFICATION SYSTEM AND RIGID BODY CHARACTERISTIC IDENTIFICATION METHOD

(75) Inventors: Robert Kloepper, Tokyo (JP); Masaaki Okuma, Tokyo (JP)

(73) Assignee: Tokyo Institute of Technology, Tokyo (JP)

( * ) Notice: Subject to any disclaimer, the term of this patent is extended or adjusted under 35 U.S.C. 154(b) by 164 days.

(21) Appl. No.: 13/261,556

(22) PCT Filed: Jun. 16, 2011

(86) PCT No.: PCT/JP2011/064325
§ 371 (c)(1),
(2), (4) Date: Jan. 4, 2013

(87) PCT Pub. No.: WO2012/005114
PCT Pub. Date: Jan. 12, 2012

(65) Prior Publication Data
US 2013/0139577 A1    Jun. 6, 2013

(30) Foreign Application Priority Data

Jul. 8, 2010  (JP) .................................. 2010-156100

(51) Int. Cl.
*G01M 7/02* (2006.01)
*G01M 7/06* (2006.01)
*G01M 1/10* (2006.01)

(52) U.S. Cl.
CPC ................ *G01M 7/025* (2013.01); *G01M 1/10* (2013.01); *G01M 7/06* (2013.01)

(58) Field of Classification Search
CPC ................................ G01M 7/025; G01M 7/06
USPC ......................................... 73/65.01, 579, 490
See application file for complete search history.

(56) References Cited

U.S. PATENT DOCUMENTS 4,339,713 A * 7/1982 Kago et al. .................... 324/173

4,403,762 A * 9/1983 Cogswell et al. ............. 248/559
(Continued)

FOREIGN PATENT DOCUMENTS

| CN | 1523334 A | 8/2004 |
| EP | 2682228 | * 8/2014 |

(Continued)

OTHER PUBLICATIONS

Du et al., "Derivation and Application of 3D-Beam's Element Stiffness and Mass Matrix with Shear Effect," Journal of Chongqing Jiaotong University, Aug. 2008, 27(4):502-507, with English abstract on p. 502.

(Continued)

*Primary Examiner* — J M Saint Surin
(74) *Attorney, Agent, or Firm* — Foley & Lardner LLP

(57) ABSTRACT

A rigid body characteristic identification system which identifies rigid body characteristics of a measurement target including its mass and center of gravity position, provided with an immovable stationary part 10, moving parts 20 which can move with respect to the stationary part and include a measurement target T, support means 30 for supporting the moving parts with respect to the stationary part in a freely vibratable manner, measuring means 40 for measuring data which is necessary for calculating the natural frequency of the moving parts when the moving parts are vibrating, and analyzing means 50 for receiving as input the support conditions by the supporting means and the measurement data which was measured by the measuring means and for performing processing based on these support conditions and natural frequency calculated from the measurement data. The analyzing means uses the support conditions by the supporting means and natural frequencies which are calculated from the measurement data as the basis to identify the rigid body characteristics of the measurement target. Due to this, a rigid body characteristic identification system or rigid body characteristic identification method which can reduce the number of measurement points while identifying the rigid body characteristics with a high precision is provided.

11 Claims, 10 Drawing Sheets

(56) References Cited

U.S. PATENT DOCUMENTS

| | | | | |
|---|---|---|---|---|
| 4,450,812 | A * | 5/1984 | Otsuka et al. | 123/438 |
| 5,456,341 | A * | 10/1995 | Garnjost et al. | 188/378 |
| 5,460,099 | A * | 10/1995 | Matsuhisa et al. | 105/148 |
| 5,999,868 | A * | 12/1999 | Beno et al. | 701/37 |
| 6,561,645 | B2 * | 5/2003 | Miyamoto | 347/106 |
| 8,398,570 | B2 * | 3/2013 | Mortimer et al. | 601/46 |
| 8,418,552 | B2 * | 4/2013 | Seto | 73/490 |
| 8,446,068 | B2 * | 5/2013 | Kasai | 310/323.16 |
| 2013/0090868 | A1 * | 4/2013 | Kajiwara et al. | 702/56 |
| 2013/0197844 | A1 * | 8/2013 | Oota | 702/94 |

FOREIGN PATENT DOCUMENTS

| | | |
|---|---|---|
| JP | 54-157684 A | 12/1979 |
| JP | 07-209129 A | 8/1995 |
| JP | 2001-350741 A | 12/2001 |
| JP | 2011-053206 A | 3/2011 |
| WO | WO 03/102528 A1 | 12/2003 |

OTHER PUBLICATIONS

Wanheng, Tian, "Calculation of Free Vibration Characteristics of Spatial Rigid Body Assembly Supported by Springs," Den Bankou, Dalian Jiaotong University Journal, vol. Z1, 1982, 131-140, with English abstract on p. 140.

Kloepper et al., "Identification of Rigid Body Inertia Parameters by Means of an Artificial Seventh Vibration Mode," Dynamics and Design Conference, 2007, 5 pages.

Kuratani et al., "System Identification of Vibration Systems Using Sensitivity Analysis ($2^{nd}$ Report, Application to a Rigid Body System Supported by Springs)," Transactions of the Japan Society of Mechanical Engineers, Mar. 1987, 53(487):542-549, with English summary of first page.

Kloepper et al., "An Experimental Identification Method for Rigid Body Properties Enabled by Gravity-Dependent Suspension Modelling," The First Joint International Conference on Muitibody System Dynamics, May 25-27, 2010, Lappeenranta, Finland, 9 pages.

Almeida et al., "Identification of rigid body properties from vibration measurements," Journal of Sound and Vibration, 2007, 299, 887-899.

Lee et al., "Response and excitation points selected for accurate rigid-body inertia properties identification," Mechanical Systems and Signal Processing, 1999, 13(4):571-592.

Pandit et al., "Determination of rigid body characteristics from time domain modal test data," Journal of Sound and Vibration, 1994, 177(1):31-41.

* cited by examiner

Fig.3
(A)
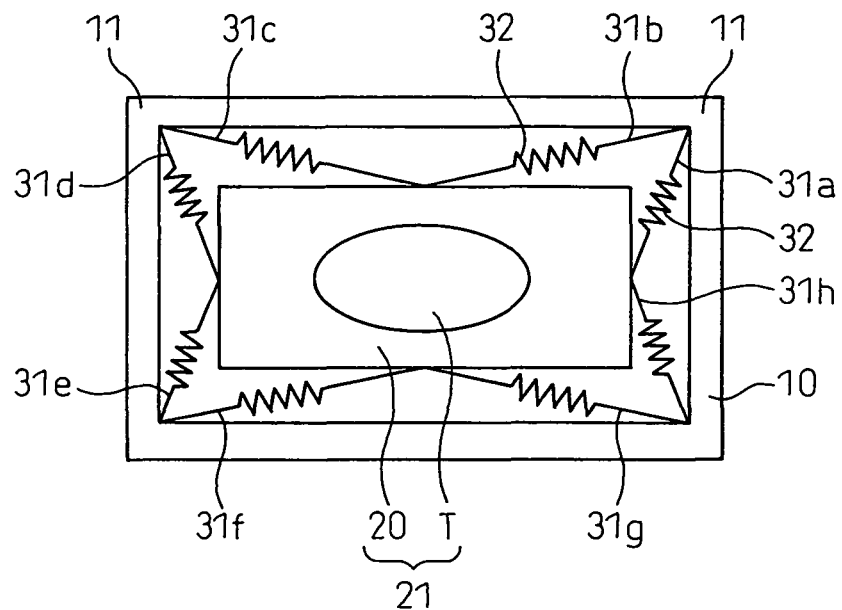
(B)
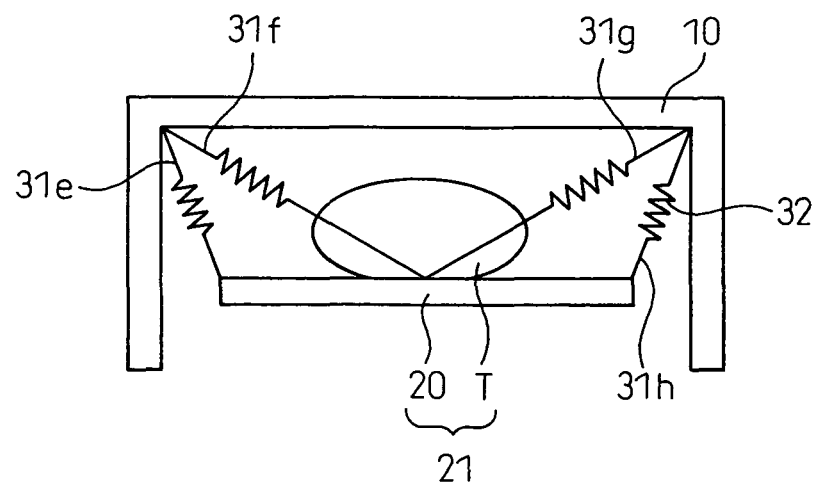

Fig.4
(A)
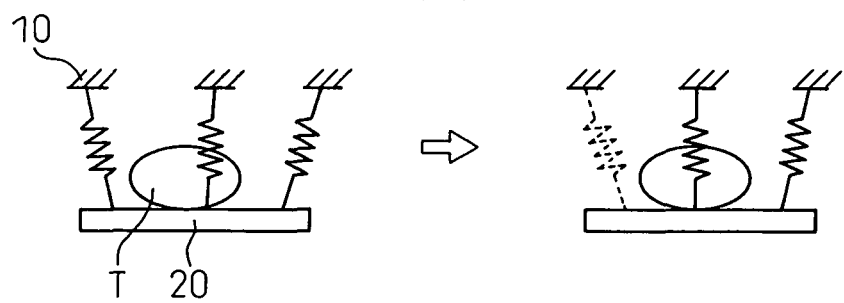
(B)
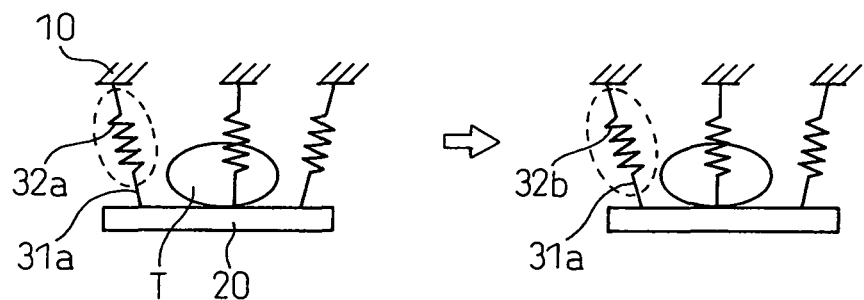
(C)
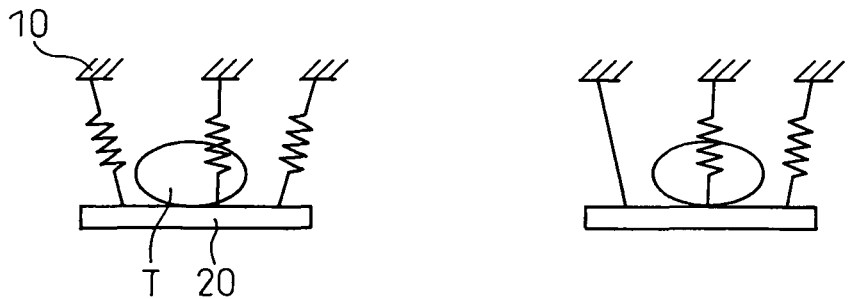

RIGID BODY CHARACTERISTIC IDENTIFICATION SYSTEM AND RIGID BODY CHARACTERISTIC IDENTIFICATION METHOD

CROSS-REFERENCE TO RELATED APPLICATIONS

This application is a National Stage application of PCT/JP2011/064325, filed Jun. 16, 2011, which claims priority from Japanese application JP 2010-156100, filed Jul. 8, 2010.

TECHNICAL FIELD

The present invention relates to a vibration analysis method and a vibration analysis system.

BACKGROUND ART

In an engine or other complicated structure, the rigid body characteristics (mass, center of mass position, three main inertia moments, orientations of three principal axes corresponding to these, etc.) are some of the biggest factors governing the motion performance or vibration/noise performance and performance in vibration/noise control of the structure. In actuality, the values of the rigid body characteristics are the most important parameters when starting a broad range of analysis, design, and optimization of dynamic behavior such as in motion analysis, vibration analysis, vibration dampening mechanism design and analysis, and control system design and analysis for assisting design. Therefore, easy identification (measurement) of the rigid body characteristics of a complicated structure by a practical precision is extremely important.

As the method of identification of such rigid body characteristics, the present inventors have proposed the method christened the "Experimental Characteristic Matrix Identification Method" (PLT 1). In this method, the measurement target is treated as an elastic body, springs etc. are used to flexibly support the measurement target, a single-point vibration, multi-point response test is run in that state, and the rigid body characteristics are found from the first order to second order or third order suitable number of resonance vibration characteristics which are obtained by the tests.

CITATIONS LIST

Patent Literature

PLT 1: Japanese Patent Publication No. 2001-350741 A1

SUMMARY OF INVENTION

Technical Problem

In this regard, with the method which the present inventors proposed, the measurement was conducted in the state with the measurement target flexibly supported by springs etc. Despite this, in the identification of the rigid body characteristics of the measurement target, the boundary conditions were approximated as "free surroundings". For this reason, the effects of support by the flexible elastic members and the so-called "geometric rigidity" were not considered. The identification error in rigid body characteristics ended up becoming relatively large.

Further, with the method which the present inventors proposed, the measurement was conducted at a plurality of measurement points. However, in this case, it is necessary to set a large number of measurement points each time expressing an elastic deformation mode. Accordingly, when conducting measurements simultaneously, a large number of sensors corresponding to that number becomes necessary. When using a small number of sensors, the sensors have to be attached and detached. Further, the coordinate information of the measurement points has to be input for each target. Therefore, if the number of measurement points is large, the time which is taken for measurement work in vibration tests increases.

Therefore, in view of the above problems, an object of the present invention is to provide a rigid body characteristic identification system or rigid body characteristic identification method which can reduce the number of measurement points while identifying rigid body characteristics with a high precision.

Solution to Problem

The present invention provides a rigid body characteristic identification system and rigid body characteristic identification method as set forth in the claims of the claim section as the solution to the problem.

To solve the problem, in a first aspect of the invention, there is provided a rigid body characteristic identification system which identifies rigid body characteristics of a measurement target including mass and center of gravity position, the rigid body characteristic identification system provided with a stationary part which cannot move, moving parts which can move with respect to the stationary part and include a measurement target, a supporting means for supporting the moving parts with respect to the stationary part in a freely vibratable manner, a measuring means for measuring data which is required for calculation of a natural frequency or natural angular frequency of the moving parts when the moving parts vibrate, and an analyzing means for receiving as input the support conditions by the supporting means and the measurement data which was measured by the measuring means and for performing processing based on these support conditions and the natural frequency or natural angular frequency which was calculated from the measurement data, the analyzing means using the support conditions by the supporting means and the natural frequency or natural angular frequency which was calculated from the measurement data as the basis to identify the rigid body characteristics of the measurement target.

To solve this problem, in a second aspect of the invention, the analyzing means uses the measurement value of the natural frequency or natural angular frequency obtained by the measuring means and the rigidity matrix [K] which was calculated by the support conditions by the supporting means as the basis to identify the components of the rigid body mass matrix [M] which approximately satisfy the following formula (1) and uses the identified components of the rigid body mass matrix [M] as the basis to identify the rigid body characteristics:

$$det([M]^{-1}[K]-\omega^2[I])=0 \quad (1)$$

In a third aspect of the invention, there is provided the second aspect of the invention wherein the natural frequency or natural angular frequency is measured by the measuring means at least three times under different measurement conditions.

In a fourth aspect of the invention, there is provided the third aspect of the invention wherein the measurement conditions are changed by changing the support conditions by the supporting means.

In a fifth aspect of the invention, there is provided the fourth aspect of the invention wherein the supporting means provides a plurality of support members which support the moving parts with respect to the stationary part, at least part of these plurality of support members are elastic members, and the support conditions are changed by at least one of removal of part of these plurality of support members, addition of a separate support member, change of a coefficient of elasticity of a support member comprised of an elastic member, change of a support member comprised of an elastic member to a nonelastic member, and change of a mounting position to one side or both sides of part of the support members.

In a sixth aspect of the invention, there is provided any one of the third to fifth aspects of the invention wherein the measurement conditions are changed by changing the configuration of a part other than the measurement target in the moving parts.

In a seventh aspect of the invention, there is provided the sixth aspect of the invention wherein the configuration of the moving parts is changed by changing the configuration of a part other than the measurement target in the moving parts and by changing a position or posture of the measurement target with respect to a part other than the measurement target.

In an eighth aspect of the invention, there is provided the fifth aspect of the invention wherein the rigidity matrix [K] is calculated based on coordinates of mounting positions of the support members to the moving parts and the coefficient of elasticity of the support members.

In a ninth aspect of the invention, there is provided the eighth aspect of the invention wherein the rigidity matrix [K] is calculated as a function of the mass and center of gravity position of the measurement target based on coordinates of mounting positions of the support members to the moving parts and a coefficient of elasticity of the support members plus mounting positions of the support members to the stationary part and a length of the support members in a natural state.

In a 10th aspect of the invention, there is provided any one of the second to ninth aspects of the invention wherein the components of the rigid body mass matrix [M] which satisfy the formula (1) are identified by optimization based on the measurement value ω of the natural frequency or natural angular frequency by the measuring means.

In an 11th aspect of the invention, there is provided any one of the first to $10^{th}$ aspects of the invention wherein the moving parts are provided with a platform and a measurement target which is placed on the platform and wherein the supporting means supports the platform.

To solve the above problem, in a 12th aspect of the invention, there is provided a rigid body characteristic identification method which identifies rigid body characteristics of a measurement target by a rigid body characteristic identification system which is provided with a stationary part which cannot move, moving parts which can move with respect to the stationary part and include a measurement target, and a supporting means for supporting the moving parts with respect to the stationary part in a freely vibratable manner, the method provided with a step of making the moving parts freely vibrate, at step of measuring a natural frequency or a natural angular frequency of vibration of the moving parts when the moving parts are freely vibrating, and a step of using support conditions by the supporting means and a measurement value of the natural frequency or natural angular frequency as the basis to identify the rigid body characteristics of the measurement target.

In a 13th aspect of the invention, there is provided the 12th aspect of the invention which is further provided with a step of changing measurement conditions by changing support conditions by the supporting means or a configuration of a part other than the measurement target in the moving part.

In a 14th aspect of the invention, there is provided the $12^{th}$ or 13th aspect of the invention wherein the step of identifying the rigid body characteristics is provided with a step of using a measurement value ω of the natural frequency or natural angular frequency by the step of measuring the natural frequency or natural angular frequency and a rigidity matrix [K] which is calculated based on support conditions by the supporting means as the basis to identify components of the rigid body mass matrix [M] which substantially satisfy the following formula (2) and a step of identifying the rigid body characteristics based on the identified components of the rigid body mass matrix [M]:

$$det([M]^{-1}[K]-\omega^2[I])=0 \qquad (2)$$

Advantageous Effects of Invention

According to the present invention, it is possible to reduce the number of measurement points while identifying rigid body characteristics with a high precision.

Below, the present invention will be understood more sufficiently from the attached drawings and the description of the preferred embodiments of the present invention.

BRIEF DESCRIPTION OF DRAWINGS

FIGS. 3A and 3B are a plan view and side view of a frame, platform, and support system of the rigid body characteristic identification system.

FIGS. 4A-4C are views which show a method of changing support conditions.

DESCRIPTION OF EMBODIMENTS

Below, the drawings will be referred to so as to explain embodiments of the present invention in detail.

Figure 1:
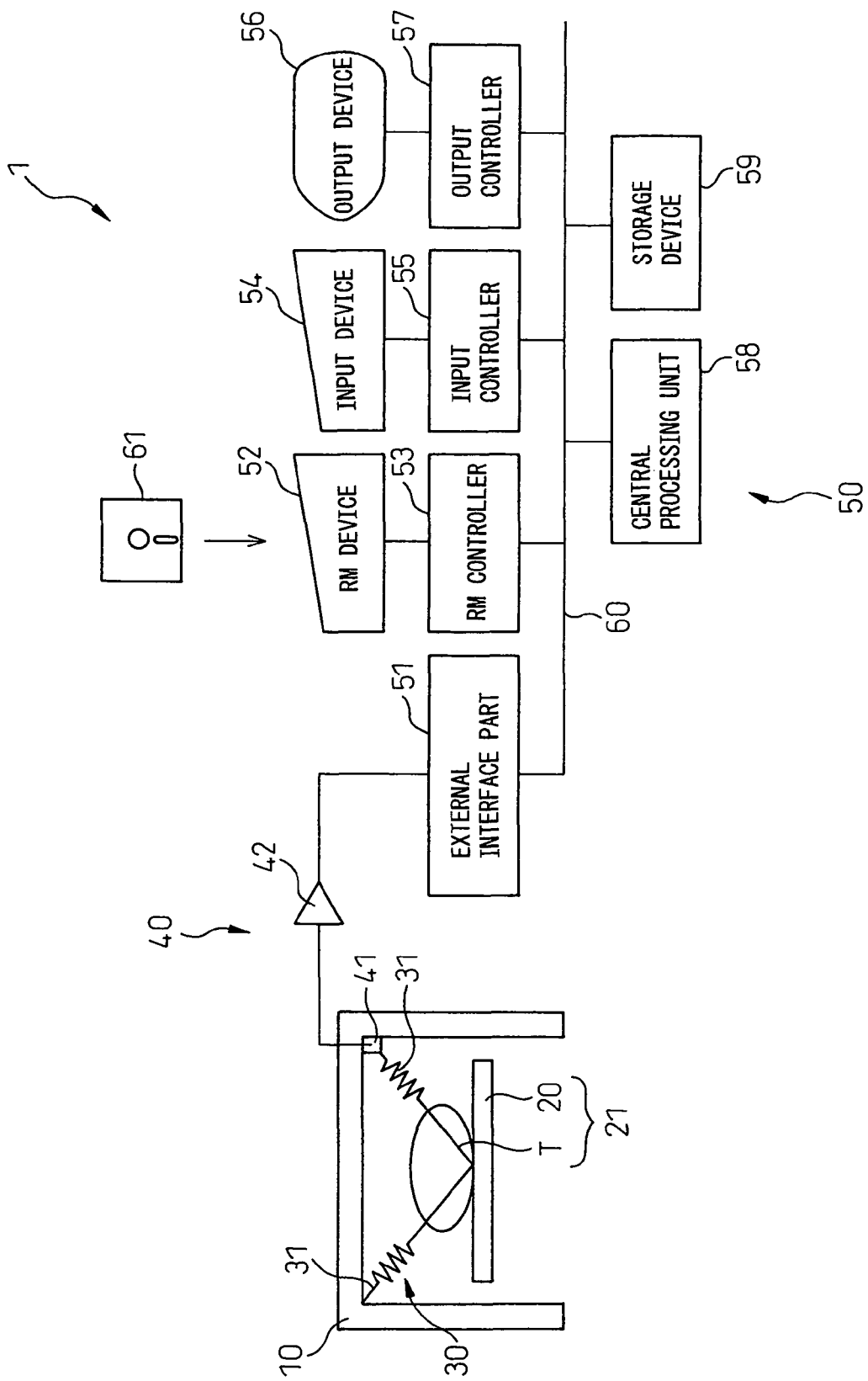
FIG. 1 is a schematic view of a rigid body characteristic identification system.

FIG. 1 is a schematic view of a rigid body characteristic identification system 1 of the present embodiment. As shown in FIG. 1, the rigid body characteristic identification system 1 is provided with a frame 10, a platform 21 which can move relative to this frame 10 and which can carry a measurement target T, a support system 30 which supports the platform 21 with respect to the frame 10 in a freely vibratable manner, a measurement device 40 which measures data which is required for calculating a natural frequency or natural angular frequency of vibration of the platform 2 when the platform 20 is vibrating with respect to the frame 10, and an analysis device 50 which receives as input the support conditions by the support system 30, measurement data which was measured by the measurement device 40, etc. and which performs processing based on these support conditions and natural frequency or natural angular frequency which was calculated from the measurement data.

Figure 2:
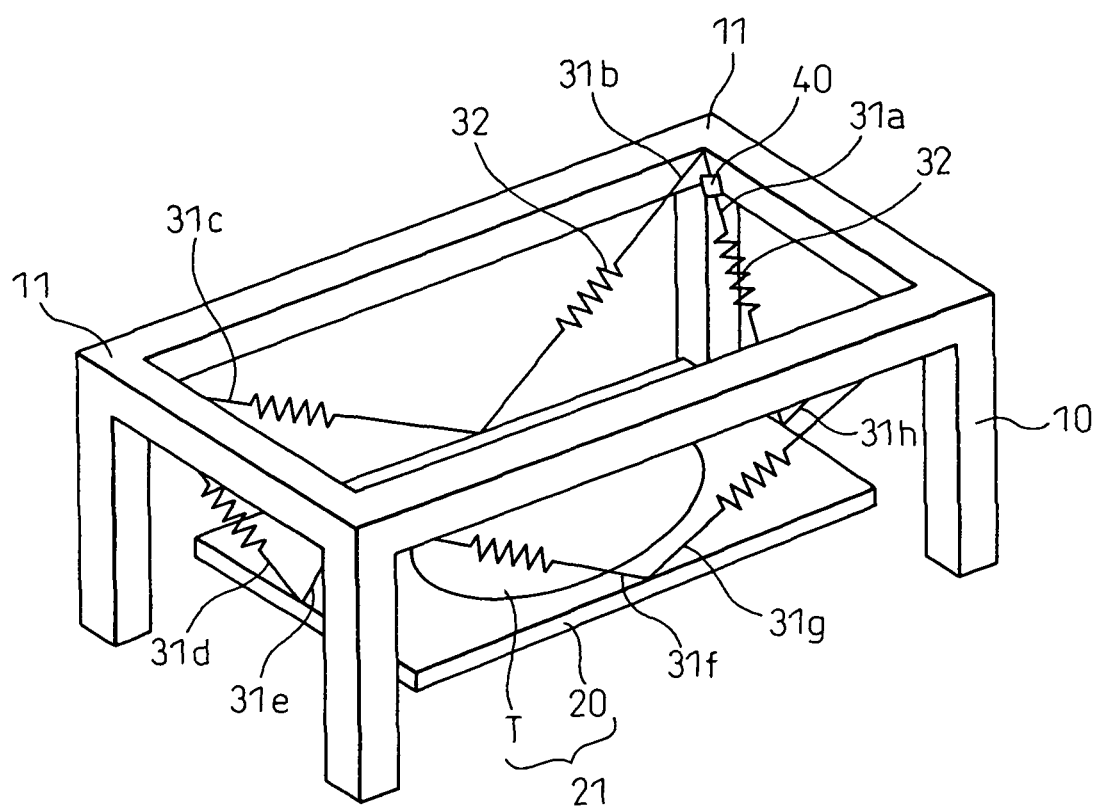
FIG. 2 is a schematic perspective view of a frame, platform, and support system of a rigid body characteristic identification system.

FIG. 2 is a schematic perspective view of the frame 10, platform 20, and support system 30 of the rigid body characteristic identification system 1 of the present embodiment, while FIG. 3A and FIG. 3B are respectively a plan view and a side view of the frame 10, platform 20, and support system 30 of the rigid body characteristic identification system 1 of the present embodiment.

The frame 10 is, for example, formed to give a box shape such as shown in FIG. 2 and FIGS. 3A and 3B. However, the frame 10 is not necessarily a box shape and may be any shape. Further, it may be comprised of any member so long as being an immovable stationary member which supports the platform 20 through the support system 30. Therefore, it is possible to use any member in place of the frame 10 so long as being a stationary member which cannot move (vibrate) with respect to the platform 20 which can move (vibrate).

The platform 20, in the example which is shown in FIG. 2 and FIGS. 3A and 3B, is made a substantially rectangular flat plate. On this platform 20, a measurement target T is placed. However, the platform 20 does not necessarily have to be a rectangular shape and further need not be a flat plate shape so long as it can carry the measurement target T on it and can freely vibrate by the support system 30.

Note that, in this Description, parts which can move (can vibrate) with respect to frame 10, that is, the stationary part, are called "moving parts 21". Therefore, when the platform 20 carries a measurement target T, since the platform 20 and measurement target T can move with respect to the frame 10, the "moving parts 21" includes the platform 20 and the measurement target T. Further, as explained later, sometimes the platform 20 carries a dummy mass. In this case, the "moving parts 21" include the platform 20 and the measurement target T plus the dummy mass. Furthermore, sometimes a measurement device 40 is attached to the platform 20 and moves (vibrates) together with the platform 20 etc. In this case, the "moving parts 21" include the platform 20 and the measurement target T plus the measurement device 40.

Further, in the present embodiment, the measurement target T is indirectly supported through the platform 20 by the support system 30. However, the platform 20 is not an essential component. It is also possible to not use the platform 20 and to directly support the measurement target T by the support system 30. In this case, the "moving parts 21" do not include the platform 20 and include only the measurement target T or the measurement target T, the dummy mass, and the measurement device 40.

The support system 30 is provided with a plurality of support members 31a to 31h which support the moving parts 21 with respect to the frame 10 (support members 31a to 31h are expressed all together by reference numeral 31). The support members 31a to 31h have first ends which are attached to the frame 10 and have other ends which are attached to the moving parts 21 (in the illustrated example, the platform 20). In the example which is shown in FIG. 2 and FIGS. 3A and 3B, the support system 30 is provided with eight support members 31a to 31h. Specifically, the support members 31a to 31h are arranged between the top corners 11 of the box shaped frame 10 and the side parts of the platform 20. As shown in FIG. 3A, the corners 11 of the box shaped frame 10 respectively have two support members 31 attached.

These two support members 31 are respectively attached to separate locations of the platform 20.

In the example which is shown in FIG. 2 and FIGS. 3A and 3B, these plurality of support members 31 all have springs 32. For this reason, the platform 20 is supported elastically with respect to the frame 10 so as to be able to freely vibrate. Note that, not all of these support members 31 have to have springs. It is sufficient that at least part of these support members 31 have springs. Further, the support members 31 have springs as elastic members, but these members do not have to be springs. So long as being elastic members, they may have rubber or other members as well.

Note that, in the above embodiment, the support system 30 is provided with eight support members 31a to 31h, but the number of support members is not limited to eight. However, there have to be at least three support members. Further, the mounting positions of the support members 31 to the frame 10 and platform 20 may be any positions so long as at least first mounting positions of the support members 31 differ from the mounting positions of any other support members 31. They need not necessarily be positions which are shown in FIG. 2 and FIGS. 3A and 3B.

Further, as explained above, instead of the frame 10, another stationary member may be used. Also, it is possible to not use the platform 20, but to directly support the measurement target T by the support system 30. Considering this, the support system 30 or the support members 31 can be said to elastically support the moving parts with respect to a stationary part in a freely vibratable manner.

The support system 30 can change the support conditions of the platform 20 with respect to the frame 10 (that is, the support conditions with respect to a stationary part). As the method of changing the support conditions, for example, the following such method which is schematically shown in FIG. 4A to FIG. 4C may be considered.

First, as the method of changing the support conditions, as shown in FIG. 4A, change of the number of support members 31 which form the support system 30 or the mounting positions of the support members 31 may be mentioned. That is, it is possible to change the support conditions by removing part of the support members among the plurality of support members 31, newly adding support members, or changing the mounting positions of the support members 31 to the frame 10 or the platform 20 or both. For example, in the example which is shown in FIG. 2 and FIGS. 3A and 3B, eight support members 31a to 31h are provided, but as shown in FIG. 4A, one or more support members among these can be removed or new support members may be added to make nine or more support members support the platform 20 and thereby change the support conditions. In particular, by changing the support members 31 which are to be removed, changing the positions of addition of the added support members 31, changing the numbers of support member 31 which are removed or added, etc., it is possible to set a large number of different support conditions.

As another method of changing the support conditions, changing the elastic coefficients of the springs (elastic members) 32 of the support members 31 may be mentioned. For example, it is possible to change the support conditions by changing the spring 31a of at least one support member 31 among the support members 31 which have the springs, as shown in FIG. 4(B), to another spring 31b with a different elastic coefficient. In particular, by replacing the springs of the support members 31 with pluralities of springs with different elastic coefficients and by changing the support members 31 for spring replacement, a large number of different support conditions can be set.

As still another method of changing the support conditions, changing the support members 31 regarding provision of the springs (elastic members) may be mentioned. For example, it is possible to change the support conditions by changing at least one of the support members 31 among the support members 31 which have springs to, as shown in FIG. 4(C), a support member which does not have a spring, that is, change it to a simple string-like member, or conversely to change a support member which does not have a spring to a support member which has a spring. In particular, it is possible to set a large number of different support conditions by changing springs and string-like members in the plurality of support members 31.

Note that, the methods of changing the support conditions may also be combined. Therefore, for example, it is possible to change the support conditions by removing certain support members 31 and changing the elastic coefficients of springs of separate support members 31. Further, these support conditions can be changed manually by the user or can be changed automatically by providing the support system 30 with a support condition changing mechanism which changes the support members 31.

The measurement device 40, for example, has a strain gauge 41 which is attached to one support member 31 and an amplifier 42 which is connected to the strain gauge 41. In the embodiment which is shown in FIG. 1, the strain gauge 41 is arranged between one of the support members 31 and the frame 10, measures the force which is applied to the support member 31 while the moving parts 21 are vibrating, that is, while the moving parts are vibrating, and converts this to an electrical signal for output. This electrical signal is amplified by an amplifier 43, then is input to an external interface part 51 of a later explained analysis device 50. In the analysis device 50, the natural frequency or natural angular frequency of the moving parts is calculated based on the force which is applied to the support member 31 which is measured by the strain gauge 41.

Note that, in the above embodiment, as the measuring device of the measurement device 40, a strain gauge 41 is used, but so long as it is possible to use the measurement data of the measurement device 40 as the basis to calculate the natural frequency or natural angular frequency of the moving parts 21, an accelerometer, a noncontact displacement meter which utilizes eddy current or laser beams, a laser Doppler velocimeter, or any other measuring device may be used. Further, from the viewpoint of finally calculating the natural frequency or natural angular frequency, the measuring device need be provided at only one of the plurality of support members 31, but to raise the measurement precision, a plurality of support members 31 may be provided with the measuring devices. Note that, in the following explanation, the case of using the measurement data of the measurement device 40 as the basis to calculate the natural angular frequency of the moving parts 21 will be explained as an example.

The analysis device 50 is provided with an external interface part 51 of a location of connection of the analysis device 50 with an external device, a removable media device (RM device) 52 which performs a write operation etc. on a removable media, a removable media controller (RM controller) 53 which controls the removable media device 52, an input device 54 which receives input from a user, an input controller 55 which controls the input device 54, an output device 56 which outputs to a display etc., an output controller 57 which controls the output device 56, a central processing unit 58 which performs various processing, a storage device 59, and a bus 60 which connects these external interface part 51, removable media controller 53, input controller 55, output controller 57, central processing unit 58, storage device 59, etc. with each other.

The external interface part 51 outputs signals which are input from the measurement device 40 to the bus 60. At the removable media device 52, it is possible to install programs which were recorded in the removable media 61 (for example, the program for performing the later explained identification processing) etc. in the analysis device 50 or record the results of analysis in the removable media 61. Note that, as the removable media 61, it is possible to use any recording media such as a floppy disk compact disk, digital versatile disk, magneto-optic disk, etc.

The input device 54 is an input device such as a keyboard, mouse, digitizer, etc. and is controlled by the input controller 55. This input device 54 can be used by the user to input the various support conditions by the support system 30 (for example, the lengths of the support members 31, the elastic coefficients of the springs 32 of the support members 31, the coordinates of the mounting positions of the support members 31 to the frame 10, the coordinates of the mounting positions of the support members 31 to the platform 20, etc.) The output device 56 is a display, printer, or other output device. The various types of data which are input to the input device 54, menu for running programs, results of analysis, etc. are output.

The central processing unit 58 is connected through a bus 60 to the external interface part 51, removable media controller 53, input controller 55, output controller 57, and storage device 59 and gives instructions to these controllers etc. Further, it performs processing such as Fourier transforms and identification processing in accordance with programs which are stored in the storage device 59. Further, the storage device 59 is comprised of a RAM (random access memory), ROM (read only memory), etc. and stores programs, temporary data during execution of programs, results of analysis, etc.

In the thus configured rigid body characteristic identification system, the rigid body characteristics of the measurement target T (that is, the mass $m_u$, center of gravity position $\{\zeta_{Gu}\}$, main inertia moments $\lambda$, and directions $\{c\}$ of principal axes of inertia of the measurement target T) are identified. Below, the processing for identification of rigid body characteristics which is performed by the thus configured rigid body characteristic identification system 1 will be explained.

First, the support conditions of the support members 31 are input through the input device 54 of the analysis device 50. Specifically, the lengths $l_p$ of the support members 31, the elastic coefficients $k_s$ of the support members 31, coordinates of the mounting positions $\zeta_{a,p}$ of the support members 31 to the platform 20 (that is, the moving parts 21), and the coordinates of the mounting positions $\zeta_{b,p}$ of the support members 31 to the frame 10 are input. Note that, the symbol "p" is a symbol which means the p-th support member. Therefore, $l_p$ means the length of the p-th support member 31.

Figure 5:
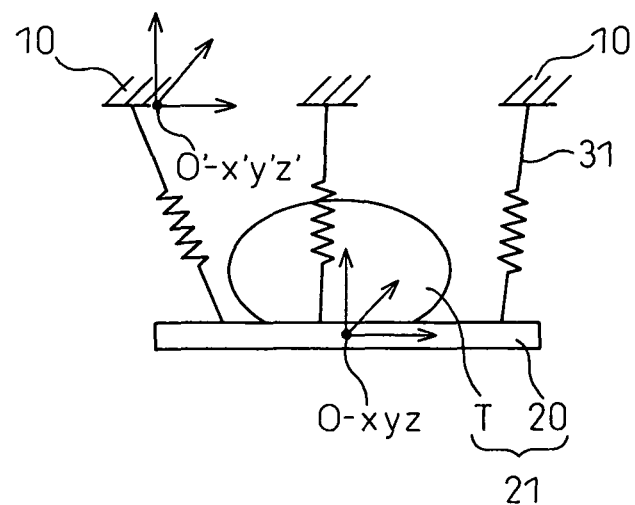
FIG. 5 is a view for explaining the principle of identification according to the present invention.

Here, as the coordinate system when inputting the coordinates of the mounting positions $\zeta_{a,s}$ of the support members 31 to the platform 20 and the coordinate system when inputting the coordinates of the mounting positions $\zeta'_{b,s}$ of the support members 31 to the frame 10, different coordinate systems are used. As shown in FIG. 5, when inputting the coordinates of the mounting positions $\zeta_{a,s}$ of the support members 31 to the platform 20, a coordinate system $O_{-xyz}$ which is based on the platform 20 or moving parts 21 (that is, which vibrates together with the platform 20 or moving parts 21) is used. Below, when expressing coordinates in this coordinate system, they will be expressed by $\zeta$ (no apostrophe). On the other hand, when inputting the coordinates of the mounting positions $\zeta'_{b,s}$ of the support members 31 to the frame 10, a coordinate system $O'_{-x',y',z'}$ which is based on the frame 10 (that is, which does not move even if the platform 20 or moving parts 21 vibrate) is used. Below, when expressing coordinates in this coordinate system, they will be expressed by $\zeta$ (with apostrophe).

Further, in the present embodiment, in addition to the support conditions by the support system 30, the configuration of the moving parts 21 can be changed. Therefore, in the present embodiment, in addition to the support conditions by the support system 30, parameters relating to the configuration of the moving parts 21 are also input.

Here, the configuration of the moving parts 21 is changed by changing the configuration of a part of the moving parts 21 other than the measurement target T or by changing the position and posture of the measurement target T on the platform 20 of the measurement target T.

Figure 6:
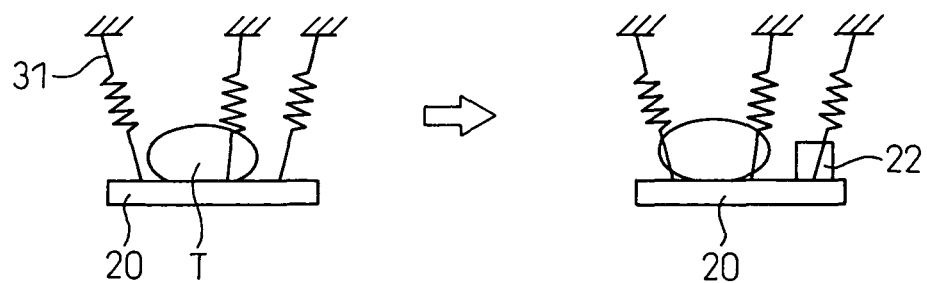
FIG. 6 is a view which schematically shows a method of changing the configuration of parts of a moving part other than the measurement target.

The configuration of a part of the moving parts 21 other than the measurement target T is changed, for example, by changing the mass and center of gravity position of a part of the moving parts 21 other than the measurement target T. Specifically, for example, as shown in FIG. 6, placement of a dummy mass (mass body) 22 at a predetermined position on the platform 20 or change of its placement position or posture, the mass etc. of the dummy mass placed, etc. may be mentioned. Therefore, in this case, the analysis device 50 receives as input the support conditions by the support system 30 plus the mass and center of gravity position of the part of the moving parts 21 other than the measurement target T (for example, when the platform 20, dummy mass 22, and measurement device 40 vibrate together with the platform 20 etc., the measurement device 40). Further, when changing the position and posture of the measurement target T on the platform 20 of the measurement target T, these relative relationship between the position and posture (for example, the difference etc. between components of two different positional coordinates) is input.

Note that, the natural angular frequency is measured a plurality of times while changing the support conditions by the support system 30 and the configuration of the moving parts 21. Below, the conditions when certain measurement is performed as determined by the support conditions by the support system 30 and the configuration of the moving parts 21 will be called the "measurement conditions". Therefore, the natural angular frequency can be said to be measured a plurality of times under different measurement conditions.

After inputting these various these measurement conditions, the measurement target T is placed at a suitable position on the platform 20, then the platform 20, that is, the moving parts 21, is made to vibrate manually or automatically. When the platform 20 is made to vibrate manually, for example, the user uses his hand to push the platform 20. On the other hand, when the platform 20 is made to vibrate automatically, for example, this is done by having the platform 20 lifted up by some sort of method, then released.

Figure 7:
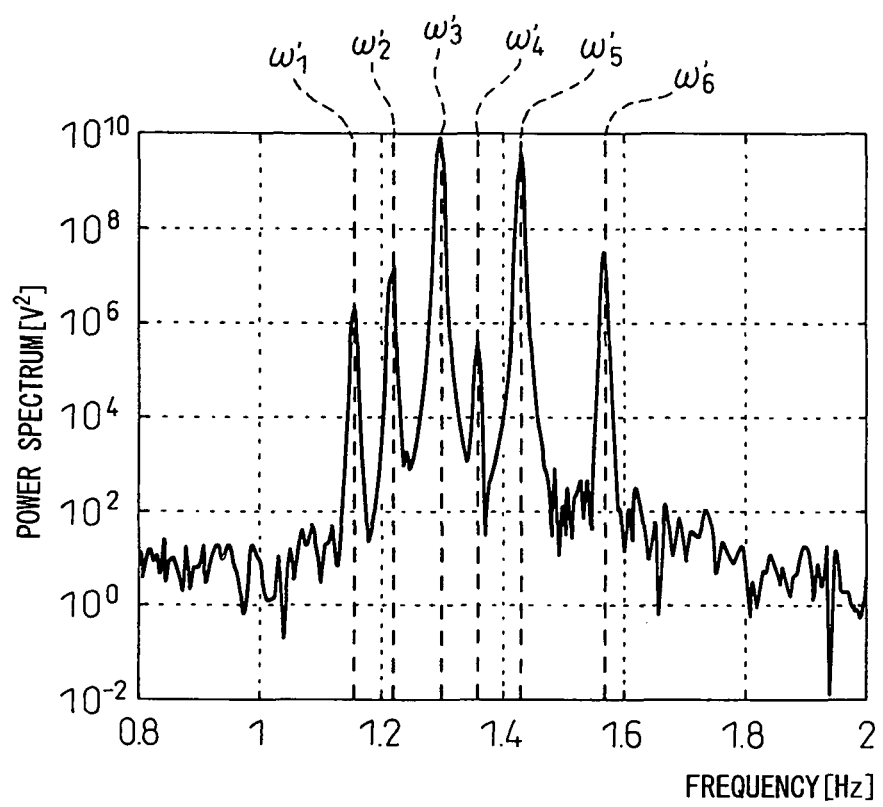
FIG. 7 is a view which shows an example of a power spectrum which is obtained from output of a measuring device.

If the platform 20 on which the measurement target T is placed is made to vibrate, the force which is applied to the support members 31 is detected by the strain gauge 41 of the measurement device 40. The output of the strain gauge 41 is input through the amplifier 42 and external interface part 51 to the analysis device 50. At the analysis device 50, the force, which changes along with time, which is detected by the strain gauge 41 is processed by a Fourier transform whereby a power spectrum with respect to frequency such as shown in FIG. 7 is found. The scale at the abscissa of FIG. 7 is made the frequency [Hz], but the plurality of peaks of the power spectrum equivalently express the natural angular frequencies of the moving parts 21. In the example which is shown in FIG. 7, it is deemed that six natural angular frequencies $\omega'_1$ to $\omega'_6$ are measured. The thus measured natural angular frequencies are stored in the storage device 59 linked with the measurement conditions.

Note that, below, the s-th natural angular frequency which is measured under the q-th measurement conditions is expressed as $\omega_{sq}$. There are at the most six natural angular frequencies which can be measured under individual measurement conditions, so "s" is 1 to 6.

When the natural angular frequencies finish being measured, the measurement conditions are changed and the natural angular frequencies are again measured. The measurement conditions are changed, for example, by changing the above-mentioned support conditions, changing the mass or center of gravity position of a part of the moving part 21 other than the measurement target T, etc.

If the measurement conditions are changed in this way, subsequently the measurement conditions are again input and the vibration and natural angular frequency of the platform 20 are measured. Such measurement is performed at least three times for the later explained reasons. The natural angular frequencies which are measured under the different measurement conditions are stored in the storage device 59 linked with the measurement conditions.

After this, the measurement conditions which are stored in the storage device 59 and the natural angular frequencies which were measured under the different measurement conditions are used as the basis for identification of the rigid body characteristics of the measurement target T by the analysis device 50 based on the identification principles which are shown below.

Note that, in the above explanation, the measurement conditions are input each time. However, when measuring the first measurement target T under a plurality of measurement conditions, then measuring a subsequent separate measurement target T, the measurement can be performed under the same plurality of measurement conditions as when measuring the first measurement target T. Therefore, the measurement conditions need not be input when measuring the second and later measurement targets T. Alternatively, if storing a plurality of measurement conditions in advance in the storage device 59 and performing the measurements under the stored measurement conditions, the measurement conditions need not be input.

Next, the basic principle of the identification processing which is performed by the rigid body characteristic identification system 1 of the present embodiment will be explained. In the present embodiment, as shown in schematically in FIG. 5, moving parts 21 which include the measurement target T and platform 20 are supported by the plurality of support members 31 in a freely vibratable manner. If assuming that the moving parts 21 which are supported in a freely vibratable manner in this way is a single rigid body, there will be only minor attenuation at the time of free vibration, so the equation of motion at the time of vibration of the moving part 21 (equation of motion with both components of translation and rotation) will be expressed by the following formula (3).

$$[M_q]\{d^2x/dt^2\}+[K_q]\{x\}=\{0\} \tag{3}$$

Here, in formula (3), $\{x\}$ expresses the vector which results from converting the coordinate system $O_{-xyz}$ based on the moving parts 21 to a fixed coordinate system with the positions and postures of the moving parts 21 as is at the static equilibrium position, then arranging the x-direction translational displacement $\delta x$, y-direction translational displacement $\delta y$, z-direction translational displacement $\delta z$, x-axis rotational displacement $\delta\theta_x$, y-axis rotational displacement $\delta\theta_y$, and z-axis rotational displacement $\delta\theta_z$ of the moving parts 21 in the vertical direction in this fixed coordinate system. Further, {f} expresses the vector which results from arranging the x-direction force fx, y-direction force fy, z-direction force fz, x-axis moment tx of force, y-axis moment ty of force, and z-axis moment tz of force which are applied to the moving parts 21 in the vertical direction in the coordinate system $O_{-xyz}$ based on the moving parts 21 (see following formula (4)). Further, $\{d^2x/dt^2\}$ is a vector which expresses the two-stage differentiation of the vector {x} which expresses displacement, that is, the acceleration of the moving parts 21. Note that, in this Description, a matrix is indicated by [ ] and a vector is indicated by { }.

$$\{x\} = \begin{Bmatrix} \delta x \\ \delta y \\ \delta z \\ \delta\theta_x \\ \delta\theta_y \\ \delta\theta_z \end{Bmatrix} \quad (4)$$

Further, the $[M_q]$ in the formula (3) is a six-row, six-column rigid body mass matrix, while $[K_q]$ is a six-row, six-column rigidity matrix. Note that, as explained above, "q" expresses the ordinal number of the measurement conditions, while $[M_q]$ and $[K_q]$ indicate a rigid body mass matrix and rigidity matrix at the respective q-th measurement conditions. Below, these rigid body mass matrix $[M_q]$ and rigidity matrix $[K_q]$ will be explained.

First, the rigid body mass matrix $[M_q]$ will be explained.

The rigid body mass matrix $[M_q]$ is a matrix which is determined by the rigid body characteristics of the moving parts 21 (mass, center of gravity position, main inertia moments, orientations of principal axes of inertia) and is expressed as in the following formula (5).

$$[M_q] = \begin{bmatrix} m[I] & -m[\{\varsigma_G\}]_x \\ m[\{\varsigma_G\}]_x & [\Theta] - m[\{\varsigma_G\}]_x[\{\varsigma_G\}]_x \end{bmatrix} \quad (5)$$

In the formula (5), "m" is the mass of the moving parts 21. If designating the mass of the measurement target T as $m_u$ and the mass of the parts of the moving part 21 other than the measurement target T (that is, platform 20, dummy mass 22, measuring device 41, etc.) as $m_v$, these are expressed by the following formula (6):

$$m = m_u + m_v \quad (6)$$

Note that, the vector $\{\varsigma_G\}$ which expresses the center of gravity coordinate of the moving parts 21 at the coordinate system $O_{-xyz}$ based on the moving parts 21 can be expressed by the following formula (7) where $\varsigma_{G,x}$ is the x-coordinate of the center of gravity of the moving parts 21, $\varsigma_{G,y}$ is the y-coordinate of the center of gravity of the moving parts, and $\varsigma_{G,z}$ is the z-coordinate of the center of gravity of the moving parts. Further, the center of gravity coordinates $\{\varsigma_G\}$ of the moving parts 21 in the coordinate system $O_{-xyz}$ can be expressed like in the following formula (8) where the center of gravity coordinates of the measurement target T are $\{\varsigma_{Gu}\}$ and the center of gravity coordinates of the parts of the moving parts 21 other than the measurement target T are $\{\varsigma_{Gv}\}$:

$$\{\varsigma_G\} = \begin{Bmatrix} \varsigma_{G,x} \\ \varsigma_{G,y} \\ \varsigma_{G,z} \end{Bmatrix} \quad (7)$$

$$\{\varsigma_G\} = \frac{1}{m}(m_u\{\varsigma_{Gu}\} + m_v\{\varsigma_{Gv}\}) \quad (8)$$

Further, in the formula (5), [I] indicates a three-row, three-column unit matrix, $[\varsigma_G]_x$ a matrix relating to the center of gravity of the moving parts 21, and $[\Theta]$ a matrix expressing the inertia tensors of the moving parts 21. These are expressed by the following formulas (9), (10), and (11):

$$[I] = \begin{bmatrix} 1 & 0 & 0 \\ 0 & 1 & 0 \\ 0 & 0 & 1 \end{bmatrix} \quad (9)$$

$$[\{\varsigma_G\}]_x = \begin{bmatrix} 0 & -\varsigma_{G,z} & \varsigma_{G,y} \\ \varsigma_{G,z} & 0 & -\varsigma_{G,x} \\ -\varsigma_{G,y} & \varsigma_{G,x} & 0 \end{bmatrix} \quad (10)$$

$$[\Theta] = \begin{bmatrix} I_{xx} & & \text{sym.} \\ I_{yx} & I_{yy} & \\ I_{zx} & I_{zy} & I_{zz} \end{bmatrix} \quad (11)$$

Here, the $\varsigma_{G,x}$, $\varsigma_{G,y}$, and $\varsigma_{G,z}$ in the formula (7) express the x-, y-, and z-coordinates of the center of gravity of the moving parts 21. Further, in the formula (7) and the Description, the symbol [ ]$_x$ is the exterior product of the vectors converted to multiplication of the matrix and vectors, that is, {a}×{b}= $[\{a\}]_x\{b\}$. Therefore, for example, if {a} is a vector with the components $a_1$, $a_2$, and $a_3$, $[\{a\}]_x$ is expressed by the following formula (12):

$$[\{a\}]_x = \begin{bmatrix} 0 & -a_3 & a_2 \\ a_3 & 0 & -a_1 \\ -a_2 & a_1 & 0 \end{bmatrix} \quad (12)$$

The inertia tensors $[\Theta]$ can be expressed like in the formula (13). Here, $[\Theta_u]$ and $[\Theta_v]$ are the inertia tensors for the origin of the coordinate system $O_{-xyz}$ relating to the measurement target T and the other moving parts 21:

$$[\Theta]=[\Theta_u]+[\Theta_v]-m_u[\{\varsigma_{Gu}\}]_x[\{\varsigma_{Gu}\}]_x-m_v[\{\varsigma_{Gv}\}]_x[\{\varsigma_{Gv}\}]_x+m[\{\varsigma_G\}]_x[\{\varsigma_G\}]_x \quad (13)$$

On the other hand, the $I_{xx}$, $I_{yy}$, and $I_{zz}$ in the formula (11) are inertia moments which express rotational inertia around the x-axis, y-axis, and z-axis in the coordinate system $O_{-xyz}$, while $I_{yx}$, $I_{zx}$, and $I_{zy}$ are inertia products which express the degrees of coupling of the x-axis and y-axis, the x-axis and z-axis, and the y-axis and z-axis in the coordinate system $O_{-xyz}$.

Therefore, the rigid body mass matrix $[M_q]$ in the formula (3) can be said to be a matrix which expresses the mass "m", center of gravity coordinates $\{\varsigma_G\}$, and inertia tensors $[\Theta]$ of the moving parts 21.

Here, if able to find the rigid body mass matrix $[M_q]$ of the moving parts 21 in the formula (3), it is possible to find the rigid body characteristics of the moving parts 21. Specifically, among the rigid body characteristics of the moving parts 21, the mass and center of gravity coordinates are directly found from "m" and $[\{\varsigma G\}]_x$ of the formula (5). On the other hand, among the rigid body characteristics of the moving parts 21, the main inertia moments and orientations of the principal axes of inertia are found from the inertia tensors [Θ] of the formula (5).

That is, regarding the inertia tensors (3-row, 3-column), the standard eigenvalue problem of the following formula (14) is solved to calculate three eigenvalues. These are the values of three main inertia moments of the moving parts 21. The eigenvectors which are normalized to lengths 1 obtained corresponding to these are the direction cosine vectors of the principal axes of inertia corresponding to the respective main inertia moments (expressing orientations of principal axes of inertia). That is, as the solution to the eigenvalue problem of formula (14), the following formula (15) is obtained.

$$\begin{bmatrix} I_{xx} & & sym. \\ I_{yx} & I_{yy} & \\ I_{zx} & I_{zy} & I_{zz} \end{bmatrix} \begin{bmatrix} c_x \\ c_y \\ c_z \end{bmatrix} = \lambda \begin{bmatrix} c_x \\ c_y \\ c_z \end{bmatrix} \tag{14}$$

$$\boxed{\text{Values of main inertia moments}} : \lambda_i \ (i = 1 \sim 3) \tag{15}$$

$$\boxed{\begin{array}{c}\text{Orientation of principal axes of inertia} \\ \text{(expressed by direction cosine vector.)}\end{array}} : \begin{bmatrix} C_x \\ C_y \\ C_z \end{bmatrix}_i \ (i = 1 \sim 3)$$

Therefore, if able to find the rigid body mass matrix $[M_q]$ in the formula (3), it is possible to find the rigid body characteristics of the moving parts 21 (mass, center of gravity coordinates, main inertia moments, and orientations of principal axes of inertia).

On the other hand, the rigid body characteristics of parts of the moving parts 21 other than the measurement target T among the moving parts 21 are found in advance by calculation or experimentally. Therefore, if able to find the rigid body characteristics of the moving parts 21, it is possible as a result to find the rigid body characteristics of the measurement target T. Therefore, the identification processing of the present embodiment can be said to find the components of the rigid body mass matrix $[M_q]$ of the formula (3) and use the found components as the basis to find the rigid body characteristics of the measurement target T.

Next, the rigidity matrix $[K_q]$ will be explained.

The rigidity matrix $[K_q]$ in the formula (3) changes in accordance with the mass "m" and center of gravity coordinates $\{\zeta_G\}$ of the moving parts 21. However, as explained above, the mass "$m_u$" and center of gravity coordinates $\{\zeta_{Gu}\}$ of the measurement target T are unknowns, so the mass "m" and center of gravity coordinates $\{\zeta_G\}$ of the moving parts 21 are also unknowns. For this reason, in the present embodiment, the rigidity matrix $[K_q]$ is found as a function of the mass "m" and center of gravity coordinates $\zeta_G$ of the moving parts 21.

In finding the rigidity matrix $[K_q]$, first, the relative position of the moving parts 21 with respect to the frame 10 when the moving parts 21 are in the static equilibrium state, that is, when the moving parts 21 are not vibrating, is calculated. Here, the relative position of the moving parts 21 to the frame 10 when the moving parts 21 are in the static equilibrium state changes in accordance with the mass "m" and center of gravity coordinates $\{\zeta_G\}$ of the moving parts 21, that is, the mass $m_u$ and center of gravity coordinates $\{\zeta_{Gu}\}$ of the measurement target T. Therefore, the relative position of the moving parts 21 to the frame 10 when the moving parts 21 are in the static equilibrium state is found as a function of the mass "m" and center of gravity coordinates $\{\zeta_G\}$ of the moving parts 21.

Here, as explained above, the coordinates of the mounting positions $\{\zeta_{a,s}\}$ of the support members 31 to the moving parts 21 (platform 20) are expressed by the coordinate system $O_{-xyz}$ based on the moving parts 21 (that is, vibrating together with the moving parts 21), while the coordinates of the mounting positions $\{\zeta'_{b,s}\}$ of the support members 31 to the frame 10 are expressed by the coordinate system $O'_{-x'y'z'}$ based on the frame 10 (that is, the moving parts 21 neither vibrate nor move). Therefore, in the present embodiment, when calculating the relative position of the moving parts 21 when the moving parts 21 are in a static equilibrium state, the relative position $\{x_{O'}\}$ of the coordinate system $O'_{-x'y'z'}$ based on the frame 10 with respect to the coordinate system $O_{-xyz}$ based on the moving parts 21 when the moving parts 21 are in the static equilibrium state and the difference $\{\theta\}$ of the orientations of these coordinate systems are calculated.

Here, the static energy coefficient $V(\{x_{O'}\}\{\theta\})$ of the moving parts 21 is expressed by the following formula (16) as a function of the relative position $\{x_{O'}\}$ and orientation $\{\theta\}$. The relative position $\{x_{O'}\}$ and orientation $\{\theta\}$ which give the smallest energy function express the relative position $\{x_O\}$ and orientation $\{\theta\}$ of the coordinate system $O'_{-x'y'z'}$ based on the frame 10 with respect to the coordinate system $O_{-xyz}$ based on the moving parts 21 when the moving parts 21 are in a static equilibrium state:

$$V(\{x_{O'}\}, \{\theta\}) = V_g + \sum_{p=1}^{N_p} V_{e,p} \tag{16}$$

In the formula (16), $N_p$ shows the total number of support members 31. Further, in formula (16), $V_{e,p}$ shows the elastic energy which is stored in the p-th support member 31 among the plurality of support members 31 and is expressed by the following formula (17).

$$V_{e,p} = \frac{1}{2} k_p (l_p - \|\zeta_{ba,p}\|)^2 \tag{17}$$

Note that, in the formula (17), $k_p$ is the p-th elastic coefficient of the support members 31, $l_p$ is the p-th length of the support members 31 in the natural state, and $\{\zeta_{ba,p}\}$ is the p-th vector which shows the mounting position of the support members 31 to the frame 10 and the mounting position to the platform 20. This vector $\{\zeta_{ba,p}\}$ is expressed by the following formula (18).

$$\{\zeta_{ba,p}\} = \{\zeta_{a,p}\} - \{x_{O'}\} - [R(\{\theta\})]^T \{\zeta'_{b,p}\} \tag{18}$$

$\{\zeta_{a,p}\}$ in the formula (18) shows the coordinates of the mounting position of the p-th support member 31 to the platform 20 in the coordinate system $O_{-xyz}$ while $\{\zeta'_{b,p}\}$ shows the coordinates of the mounting position of the p-th support member 31 to the frame 10 in the coordinate system $O'_{-x'y'z'}$. In this way, $\{\zeta_{a,p}\}$ and $\{\zeta'_{b,p}\}$ are expressed by different coordinate systems, so in the formula (18), the relative of position $\{x_{O'}\}$ and orientation $\{\theta\}$ of these coordinate systems are used for a conversion operation to express the coordinates of the mounting position $\{\zeta'_{b,p}\}$ of the s-th support member 31 to the frame 10 by the coordinate system $O_{-xyz}$. Note that, $[R(\{\theta\})]$ in formula (18) is expressed by the following formula (19). $\theta_x$, $\theta_y$, and $\theta_z$ in formula (19) are components of the vector $\{\theta\}$.

$$[R(\{\theta\})] = \begin{bmatrix} 1 & 0 & 0 \\ 0 & \cos\theta_x & \sin\theta_x \\ 0 & -\sin\theta_x & \cos\theta_x \end{bmatrix} \begin{bmatrix} \cos\theta_y & 0 & -\sin\theta_y \\ 0 & 1 & 0 \\ \sin\theta_y & 0 & \cos\theta_y \end{bmatrix} \quad (19)$$

$$\begin{bmatrix} \cos\theta_z & \sin\theta_z & 0 \\ -\sin\theta_z & \cos\theta_z & 0 \\ 0 & 0 & 1 \end{bmatrix}$$

On the other hand, in the formula (16), $V_g$ shows the gravity energy which is applied to the moving parts 21 and is expressed by the following formula (20).

$$V_g = (\{x_{O'}\} - \{\zeta_G\})^T \{f_G\} \quad (20)$$

In formula (20), $\{f_G\}$ is a vector which shows the direction and magnitude of gravity in the coordinate system $O'_{-x'y'z'}$ and is expressed by the following formula (21). Note that, $\{n'_g\}$ in formula (21) is a unit vector which shows the direction of gravity in the coordinate system $O'_{-x'y'z'}$.

$$\{f_G\} = mg[R(\{\theta\})]^T \{n'_g\} \quad (21)$$

Further, based on the position $\{x_{O'}\}$ and orientation $\{\theta\}$ obtained by making the formula (16) the smallest, more particularly, using the vector $\{\zeta_{ba,p}\}$ which is obtained by entering the thus obtained position $\{x_{O'}\}$ and orientation $\{\theta\}$ into the formula (18) and the $\{f_G\}$ obtained by the formula (21), the rigidity matrix $[K_q]$ is calculated by the following formula (22). Note that, the $\{T_p\}$, $\{J_p\}$, and $\{f_p\}$ in the formula (22) are expressed by the following formulas (23), (24), and (25):

$$[K_q] = \quad (22)$$

$$-\sum_{p=1}^{N_p} [T_p]^T [J_p][T_p] = \begin{bmatrix} [0] & [0] \\ [0] & [\{f_G\}]_x [\{\zeta_G\}]_x + \sum_{p=1}^{N_p} [\{f_p\}]_x [\{\zeta_{a,p}\}]_x \end{bmatrix}$$

$$[T_p] = \lfloor [I] \quad [-\{\zeta_{a,p}\}]_x \rfloor \quad (23)$$

$$[J_p] = -k_p\left(1 - \frac{l_p}{\|\{\zeta_{ba,p}\}\|}\right)[I] - k_p \frac{l_p}{\|\{\zeta_{ba,p}\}\|^3} \{\zeta_{ba,p}\}\{\zeta_{ba,p}\}^T \quad (24)$$

$$\{f_p\} = -k_p(\|\{\zeta_{ba,p}\}\| - l_p)\frac{\{\zeta_{ba,p}\}}{\|\{\zeta_{ba,p}\}\|} \quad (25)$$

The rigidity matrix $[K_q]$ is a matrix which expresses the force which is applied to the moving parts 21 when the moving parts 21 engage in slight translational and rotational displacement from the static equilibrium state. Here, the directions of the forces which are applied from the support members 31 to the moving parts 21 change along with vibration of the moving parts 21, but in the present embodiment, as will be understood from the formula (22), the rigidity matrix $[K_q]$ is calculated while considering the changes in directions of the forces which are applied from the support members 31 to the moving parts 21 along with vibration of the moving parts 21.

Here, as will be understood from the formulas (16) to (25), in calculating the rigidity matrix $[K_q]$, the unknowns of the mass "m" and center of gravity coordinates $\{\zeta_G\}$ of the moving parts 21 become necessary. Considered conversely, the rigidity matrix $[K_q]$ can be said to be a function of the mass "m" and center of gravity coordinates $\{\zeta_G\}$ of the moving parts 21.

Note that, the mass "m" and center of gravity coordinates $\{\zeta_G\}$ of the moving parts 21 can be found if learning the mass $m_u$ and center of gravity coordinates $\{\zeta_{Gu}\}$ of the measurement target T since the mass $m_v$ and center of gravity coordinates $\{\zeta_{Gv}\}$ of the parts of the moving parts 21 other than the measurement target T are known in advance. Here, the mass $m_u$ and center of gravity coordinates $\{\zeta_{Gu}\}$ of the measurement target T can be found relatively easily even by a method other than the method according to the present invention compared with the main inertia moments of the measurement target T or orientations of principal axes of inertia. Therefore, it is also possible to calculate in advance the mass $m_u$ and center of gravity coordinates $\{\zeta_{Gu}\}$ of the measurement target T, therefore, the mass "m" and center of gravity coordinates $\{\zeta_G\}$ of the moving parts 21, and determine the components of the rigidity matrix $[K_q]$ in advance. By this, the rigidity matrix $[K_q]$ does not become a function of the mass "m" and center of gravity coordinates $\{\zeta_G\}$ of the moving parts 21, so the processing for identification of the moving parts 21 and measurement target T can be simplified.

Return again to formula (3).

The formula (3) which is expressed by a differentiation equation in the time domain can be converted by a Laplace transform to an equation in the frequency domain as shown in the following formula (26). In formula (26), $\{\Psi(\omega)\}$ is the vector $\{x\}$ of formula (3) converted by a Laplace transform and is a function of the frequency $\omega$:

$$(-\omega^2 [M_q] + [K_q])\{\psi(\omega)\} = \{0\} \quad (26)$$

The eigenvalue and eigenvector of the system which is shown in the formula (26) are obtained by solving the eigenvalue problem of the following formula (27). In formula (27), the eigenvector $\{\psi_{sq}\}$ (6-row, 1-column) expresses the mode of the s-th rigid body mode at the time of the q-th calculation, while the eigenvalue $\omega_{sq}^2$ expresses the square of the natural angular frequency at the s-th rigid body mode at the time of the q-th calculation.

$$([M_q]^{-1}[K_q] - \omega_{sq}^2 [I])\{\psi_{sq}\} = \{0\} \quad (27)$$

The solution of the eigenvalue of the eigenvalue problem of the formula (27) (that is, where the natural angular frequency is found) is obtained by solving the following formula (28).

$$det([M_q]^{-1}[K_q] - \omega'^2_{sq}[I]) = 0 \quad (28)$$

In the above formula (28), $[M_1]^{-1}[K_q]$ includes 10 unknowns (that is, mass "m" of moving parts 21, coordinates $\zeta_{Gx}, \zeta_{Gy},$ and $\zeta_{Gz}$ of center of gravity position of moving parts 21, inertia moments $I_{xx}, I_{yy},$ and $I_{zz}$, and inertia products $I_{yx}, I_{zx},$ and $I_{zy}$).

In this regard, as explained above, in measurement of the natural angular frequency using the measurement device 40, a maximum of six natural angular frequencies are measured under each of the measurement conditions. These are expressed as $\omega'_{sq}$ ($s=1, \ldots, 6; q=1, \ldots, N_q$). By entering the natural angular frequency $\omega'_{sq}$ which was obtained by measurement in this way into the formula (28), it is possible to obtain six equalities for each of the measurement conditions. Therefore, if measuring the natural angular frequency $N_q$ times, it is possible to obtain at the maximum $6 \times N_q$ number of equalities.

Therefore, by solving these maximum $6 \times N_q$ number of equalities, it is possible to find the 10 unknowns of $[M_q]^{-1}[K_q]$. Specifically, the maximum $6 \times N_q$ number of natural angular frequencies $\omega'_{sq}$ which were found by measurement are used to solve the optimization problems of the following formulas (29) and (30) and thereby find the above 10 unknowns. As the optimization method, the Newton-Raphson method, Gauss-Newton method, the Levenberg-Marquardt method, and other optimization methods may be used.

Note that, in formula (30), [I] is a six-row, six-column unit matrix, while {r} shows a vector combining the parameters of the rigid body characteristics (therefore, the components of {r} are m, $\zeta_{Gx}$, $\zeta_{Gy}$, $\zeta_{Gz}$, $I_{xx}$, $I_{yy}$, $I_{zz}$, $I_{yx}$, $I_{zx}$, and $I_{zy}$).

$$\min_{r \in R^{10}} f(\{r\}) \tag{29}$$

$$f(\{r\}) = \sum_{s=1}^{6} \sum_{q=1}^{N_q} \det([M_q]^{-1}[K_q] - \omega_{sq}'^{2}[I])^2 \tag{30}$$

Specifically, first, suitable values are entered for the 10 unknowns, then the entered values of these unknowns are changed bit by bit for repeated computation, then finally the values which give the smallest solution of all of the matrix equations at the right side of the formula (30) are identified as the values of these unknowns. Due to this, the mass "m" of the moving parts 21, the coordinates $\zeta_{Gx}$, $\zeta_{Gy}$, $\zeta_{Gz}$ of the center of gravity positions of the moving parts 21, the inertia moments $I_{xx}$, $I_{yy}$, and $I_{zz}$, and the inertia products $I_{yx}$, $I_{zx}$, and $I_{zy}$ are identified. Based on these identified values, the rigid body characteristics of the measurement target T are found.

Note that, as explained above, there are 10 unknowns in the formula (27). On the other hand, performing measurement under one set of measurement conditions can give a maximum of six natural angular frequencies and accordingly give six equalities. Therefore, if performing measurement two times under different measurement conditions, a maximum of 12 equalities are obtained. This number of equalities are larger than the number of unknowns, so it may be thought that if performing measurement under different measurement conditions, at the minimum two measurement conditions, it would be possible to identify the 10 unknowns from the formula (27). However, the equalities which are obtained above are not all independent equalities. Therefore, with two measurements, it is not possible to identify the 10 unknowns. Therefore, in the present embodiment, it is necessary to perform the measurement a minimum of three times.

Note that, the precision of identification by the formulas (29) and (30) is not necessarily sufficiently high. In the experience of the inventors, rather than the formula (30), use of the following formula (32) which is obtained by dividing the formula (30) by $\omega_{sq}'$ to perform optimization based on the following formulas (31) and (32) gives a higher precision of identification. This is due to the problems in numerical calculations.

$$\min_{r \in R^{10}} g(\{r\}) \tag{31}$$

$$g(\{r\}) = \sum_{s=1}^{6} \sum_{q=1}^{N_q} \det\left(\frac{1}{\omega_{sq}'}[M_q]^{-1}[K_q] - \omega_{sq}'[I]\right)^2 \tag{32}$$

Here, it is considered that the measured natural angular frequency $\omega_{sq}'$ includes dispersed error. For this reason, to identify the unknowns with a high precision, it is preferable to fit the theoretical natural angular frequency $\omega_{sq}$ of the square root of the eigenvalue of $[M_q]^{-1}[K_q]$ to the measured natural angular frequency $\omega_{sq}'$ by the least square method. The fitting of the theoretical natural angular frequency $\omega_{sq}$ is performed by the following formulas (33) and (34).

$$\min_{r \in R^{10}} h(\{r\}) \tag{33}$$

$$h(\{r\}) = \sum_{s=1}^{6} \sum_{q=1}^{N_q} (\omega_{sq}' - \omega_{sq})^2 \tag{34}$$

Note that, in the formula (34), it is necessary to also calculate the correspondence between the theoretical natural angular frequency $\omega_{sq}$ and the measured natural angular frequency $\omega_{sq}'$. In this regard, in the state where the unknowns are completely unclear, the correspondence between the theoretical natural angular frequency $\omega_{sq}$ of the square root of the eigenvalue of the $[M_q]^{-1}[K_q]$ and the theoretically measured natural angular frequency $\omega_{sq}'$ is unclear, so it is not possible to enter the natural angular frequency $\omega_{sq}$ which was found by measurement directly into the formula (34) for optimization. Therefore, it is preferable to use the formula (29) and formula (30) to find the unknowns in advance and use the theoretical natural angular frequency $\omega_{sq}$ which was calculated based on the found unknowns as initial values so as to perform optimization by the formulas (33) and (34). Due to this, it is possible to raise the precision of identification of the rigid body characteristics of the moving parts 21 and, therefore, the measurement target T.

Next, the processing for identification which is performed at the analysis device 50 will be explained. The identification processing which is performed at the analysis device 50 is performed based on the above-mentioned basic principle.

First, a plurality of combinations of initial values of the rigid body characteristics (mass $m_u$ of measurement target T, position of center of gravity $\{\zeta_{Gu}\}$, main inertia moments $\lambda$, and orientations {c} of principal axes of inertia) of the measurement target T are randomly generated. However, the initial values are generated considering physical limiting conditions such as, for example, the fact that the position of the center of gravity is inside the block surrounding the measurement target T.

Next, the $N_k$ number of (for example 1000) produced combinations $r_k$ (k=1, . . . , $N_k$) of initial values of rigid body characteristics are entered into the formula (30) or formula (32) and, among these plurality of combinations of initial values of rigid body characteristics, $N_l$ number (for example, 10) of combinations $r_l$ (l=1, . . . , $N_l$) giving the smallest $f(\{r_k\})$ or $g(\{r_k\})$ are selected.

Next, as explained above, the selected combinations $r_l$ of initial values are entered into the formulas (29) and (30) or the formulas (31) and (32) for optimization. In the ideal case, in all of these $N_l$ sets of combinations $r_l$ of initial values, the solutions of the optimization problems of the formulas (29) and (30) or the formulas (31) and (32) become the same or substantially the same.

The solutions to the optimization problems of the formulas (29) and (30) or the formulas (31) and (32) found in this way are used as the initial values of the optimization problems of the formulas (33) and (34). By solving the optimization problems, the final rigid body characteristics of the moving parts 21 are calculated, then the rigid body characteristics of the measurement target T are calculated.

Note that, when part of the $N_l$ set of solutions which are obtained by optimization by the formulas (29) and (30) or the formulas (31) and (32) will not become the same, it may be considered that such a part of solutions of the optimization problems are not global minimums, but local minimums. Therefore, the solutions of the optimization problems which are local minimums are removed and the remaining solutions of the optimization problems are used as initial values of the optimization problems of the formulas (33) and (34).

The advantages of identification of the rigid body characteristics of the measurement target T by the technique explained above will be explained below.

For example, in the method of identification of rigid body characteristics which is shown in PLT 1, the measurements are conducted in the state where the measurement target is flexibly supported by springs etc. Despite this, in the identification of the rigid body characteristics of the measurement target, the support boundary conditions are approximated as "free surroundings". As opposed to this, in the present embodiment, the support boundary conditions of the moving parts 21, including the measurement target, are not approximated as "free surroundings". The elastic coefficients of the support members 31 of the support system 30 and the mounting positions are utilized and incorporated into the calculation formulas (in particular, the formula (22)). For this reason, this enables the precision of identification of the rigid body characteristics of the measurement target T to be made higher. Further, as explained above, in formula (22), the changes in directions of forces applied from the support members 31 to the moving parts 21 accompanying vibration of the moving parts 21 are considered, that is, "geometric rigidity" is considered. Therefore, this also enables the precision of identification of the rigid body characteristics of the measurement target T to be made higher.

Further, in the present embodiment, as explained above, the only parameter to be measured is the natural angular frequency. For this reason, a single measuring device 41 is sufficient. Further, as the measuring device 41, it is possible to use any measuring device so long as it can measure the period of vibration. For this reason, the rigid body characteristic identification system 1 as a whole can be made inexpensive.

Further, in using the measuring device 41 to measure the period of the vibration, there is no need to accurately find the absolute value of the parameter which is detected by the measuring device 41 (for example, the value of the force in the case of a strain gauge). Therefore, there is no need to accurately calibrate the measuring device 41. Therefore, the identification operation by the rigid body characteristic identification system 1 can be performed in a short time.

Further, according to the rigid body characteristic identification system 1 of the present embodiment, by just changing the size of the frame 10 or platform 20, the invention can be applied to various measurement targets from small measurement targets (for example, data processing devices, precision machinery, their parts, etc.) to large measurement targets (for example, large vehicles, containers, large ship engines, aircraft, etc.) For this reason, for example, the scope of utilization can be said to be broader compared with conventional identification systems which make measurement targets actively swing for identification.

Note that, the meanings of the symbols which are used in the Present Description are summarized below.
[ ]: matrix
{ }: vector
p: p-th support member
q: q-th measurement
s: order of natural angular frequency
$N_p$: total number of support members
$N_q$: total number of measurements
$[M_q]$: rigid body mass matrix of moving part at time of q-th measurement
$[K_q]$: rigidity matrix at time of q-th measurement
$k_p$: p-th coefficient of elasticity of the support members
$l_p$: p-th length of the support members in natural state $O_{-xyz}$: coordinate system based on platform 20 or moving part 21
$O'_{-x'y'z'}$: coordinate system based on frame 10
$\{\zeta_{a,p}\}$: p-th mounting coordinate of platform 20 of support members at $O_{-xyz}$ coordinate system
$\{\zeta'_{b,p}\}$: p-th mounting coordinate of support members at frame 10 at $O'_{-x'y'z'}$ coordinate system
$\{n'_g\}$: direction of gravity in $O'_{-x'y'z'}$ coordinate system

EXAMPLES

Example 1

Figure 8:
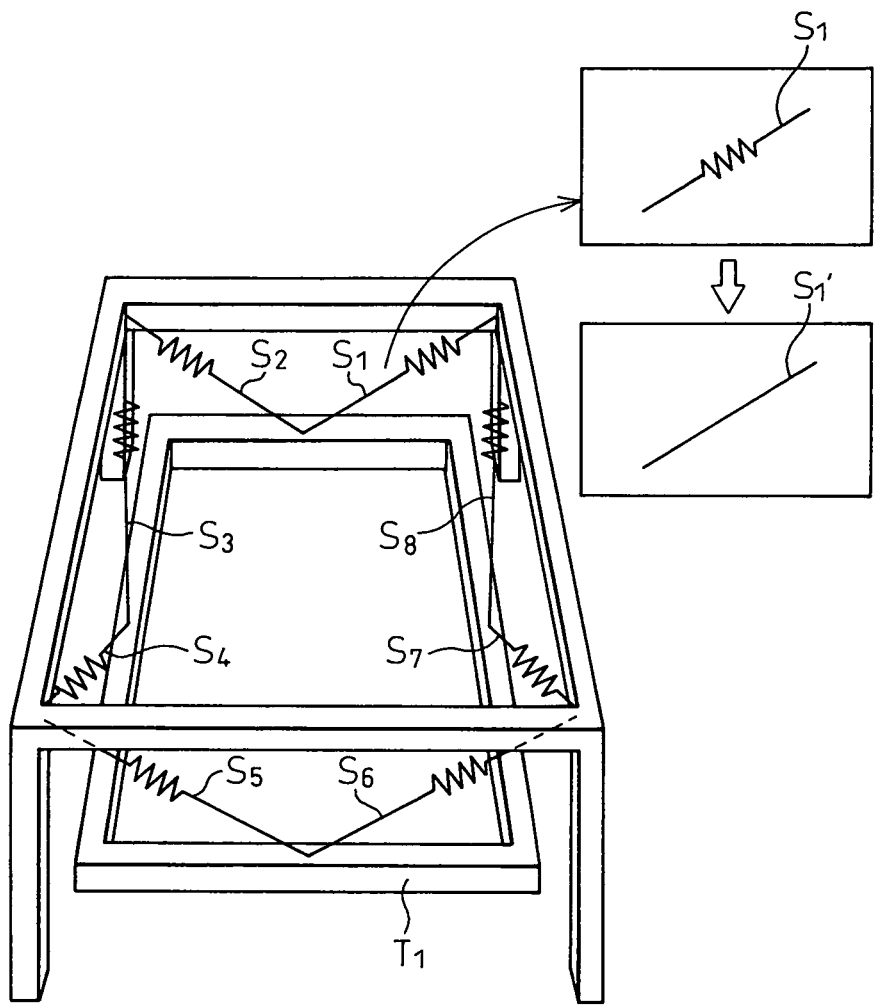
FIG. 8 is a view which shows a test state in Example 1.

The measurement target is made a rectangular aluminum frame $T_1$ (1.7×1.5×0.05 m) such as shown in FIG. 8. The measurement target $T_1$ is directly supported by the support members without using a platform. That is, the moving parts 21 are made only the measurement target $T_1$. As the support members 31, eight spring straps $S_1$ to $S_8$ are used. The natural frequency is measured by acceleration sensors. The measurement conditions are changed by changing the spring strap $S_1$ to a spring-less strap $S_1'$. The identification results in the case of using the above-mentioned identification technique under such test conditions are shown in Table 1.

TABLE 1

Test Results of Example 1 (Relating to Measurement Target $T_1$)

| Parameter | Unit | True value | Error g({r}) | Error h({r}) |
|---|---|---|---|---|
| m | kg | 15.52 | −0.0902 | −0.0402 (0.26%) |
| $I_{xx}$ | kgm² | 5.301 | 0.0361 | 0.0116 (0.21%) |
| $I_{yy}$ | kgm² | 6.463 | 0.0840 | 0.0033 (0.05%) |
| $I_{zz}$ | kgm² | 11.72 | −0.0473 | −0.0631 (0.54%) |
| $I_{xy}$ | kgm² | 0 | 0.1493 | 0.0413 |
| $I_{xz}$ | kgm² | 0 | 0.0061 | 0.0022 |
| $I_{yz}$ | kgm² | 0 | −0.0068 | −0.0073 |
| $\zeta_{G,x}$ | mm | 850 | 0.7 | 0.7 |
| $\zeta_{G,y}$ | mm | 750 | 0.6 | 0.4 |
| $\zeta_{G,z}$ | mm | −50 | 7.5 | −2.8 |

The true values in Table 1 are found by calculations from the shape of the aluminum frame $T_1$ of the measurement target. Further, in the error, g({r}) is the error of the identification results with respect to the true value in the case of using the formula (31) and formula (32) to identify the rigid body characteristics of the aluminum frame T1, while h({r}) is the error of the identification results with respect to the true value in the case of using the formula (33) and formula (34) to identify the rigid body characteristics of the aluminum frame T1. Further, the parentheses in the column of h({r}) indicate the ratios of the errors with respect to the true values. As will be understood from Table 1, the error in the identification results is in each case less than 1%.

Example 2

Figure 9:
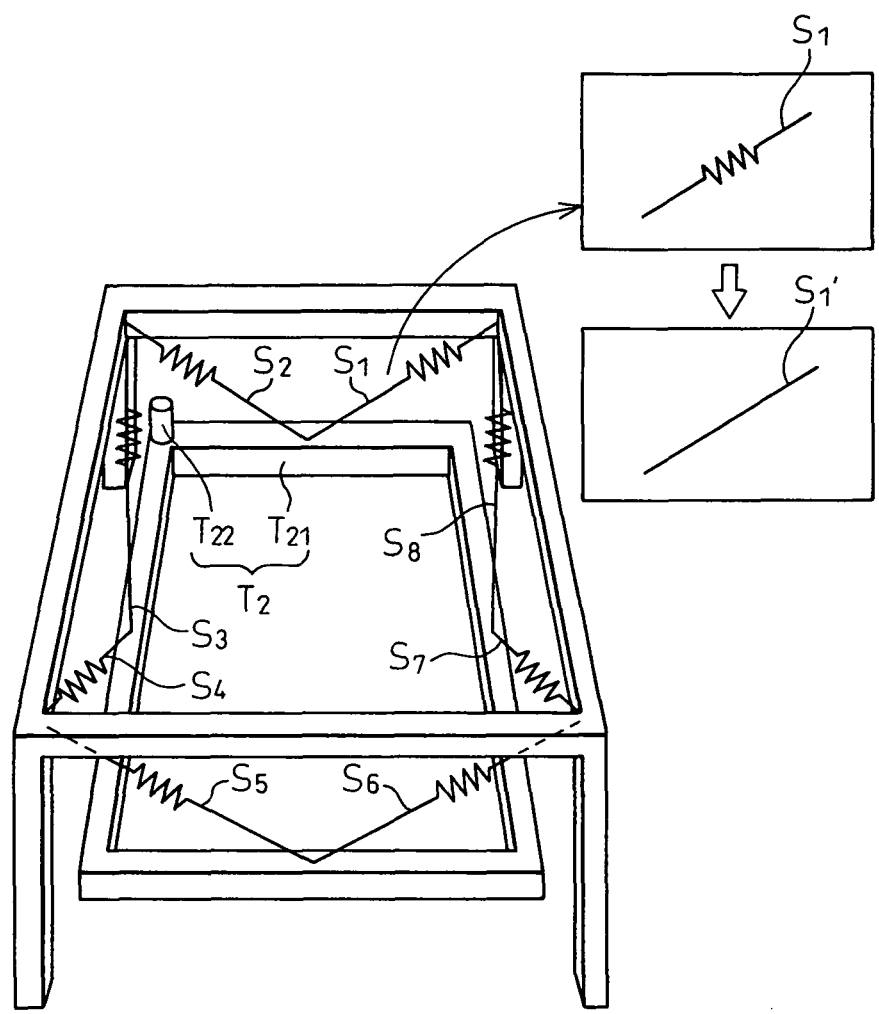
FIG. 9 is a view which shows a test state in Example 2.

Next, the measurement target, as shown in FIG. 9, is made a rectangular aluminum frame $T_{21}$ at one corner of which a 1.87 kg columnar mass body $T_{22}$ is placed to form a target $T_2$. Further, the measurement target $T_2$ is directly supported by the support members without using a platform. As the support members 31, eight spring straps $S_1$ to $S_8$ are used. The natural frequency is measured by acceleration sensors. The measurement conditions are changed by changing the spring strap $S_1$ to the spring-less strap $S_1'$. The identification results of the measurement target $T_2$ in the case of using the above-mentioned identification technique under such test conditions are shown in Table 2.

TABLE 2

Test Results of Example 2 (Relating to Measurement Target $T_{21}$ + Dummy Mass (1.87 kg))

| Parameter | Unit | True value | Error g({r}) | Error h({r}) |
|---|---|---|---|---|
| m | kg | 17.39 | −0.0043 | 0.0440 (0.28%) |
| $I_{xx}$ | kgm² | 6.182 | 0.0825 | 0.0271 (0.51%) |
| $I_{yy}$ | kgm² | 7.546 | 0.1000 | 0.0709 (1.10%) |
| $I_{zz}$ | kgm² | 13.65 | −0.2528 | −0.1381 (1.28%) |
| $I_{xy}$ | kgm² | −0.959 | 0.0144 | 0.0073 |
| $I_{xz}$ | kgm² | 0.133 | −0.0144 | 0.0012 |
| $I_{yz}$ | kgm² | 0.121 | −0.0128 | −0.0191 |
| $\zeta_{G,x}$ | mm | 764 | 4.9 | 3.8 |
| $\zeta_{G,y}$ | mm | 673 | 6.9 | 4.2 |
| $\zeta_{G,z}$ | mm | −39 | −1.2 | −1.4 |

The true values in Table 2 are found by calculations from the shape of the measurement target $T_2$. As will be understood from Table 2, the error of the identification results is in each case less than about 1%.

Example 3

Figure 10:
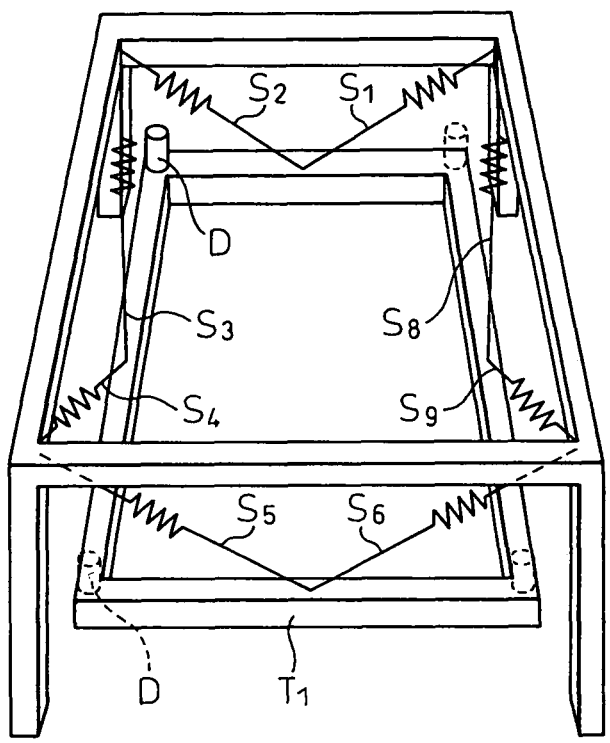
FIG. 10 is a view which shows a test state in Example 3.

Next, the measurement target, as shown in FIG. 10, is made a rectangular aluminum frame $T_1$ and the measurement target $T_1$ is directly supported by the support members without using a platform. As the support members 31, eight spring straps $S_1$ to $S_8$ are used. The natural frequency is measured by acceleration sensors. The measurement conditions are changed by changing the placement position of the 1.87 kg columnar mass body (dummy mass) D to between the four corners of the aluminum frame T1. The identification results of the measurement target $T_1$ in the case of using the above-mentioned identification technique under such test conditions are shown in Table 3. The true values in Table 3 are found by calculations from the shape of the measurement target $T_1$. As will be understood from Table 3, the error of the identification results is in each case less than about 1%.

TABLE 3

Test Results of Example 3 (Relating to Measurement Target $T_1$)

| Parameter | Unit | True value | Error g({r}) | Error h({r}) |
|---|---|---|---|---|
| m | kg | 15.52 | 0.1745 | 0.0500 (0.32%) |
| $I_{xx}$ | kgm² | 5.301 | 0.1082 | 0.0274 (0.51%) |
| $I_{yy}$ | kgm² | 6.462 | 0.0154 | 0.0483 (0.74%) |
| $I_{zz}$ | kgm² | 11.72 | −0.1508 | −0.0988 (0.84%) |
| $I_{xy}$ | kgm² | 0 | 0.0149 | 0.0037 |
| $I_{xz}$ | kgm² | 0 | −0.0053 | −0.0479 |
| $I_{yz}$ | kgm² | 0 | −0.1081 | 0.0299 |
| $\zeta_{G,x}$ | mm | 850 | 2.2 | 3.1 |
| $\zeta_{G,y}$ | mm | 750 | −1.2 | −3.0 |
| $\zeta_{G,z}$ | mm | −50 | 7.1 | −1.3 |

Example 4

Figure 11:
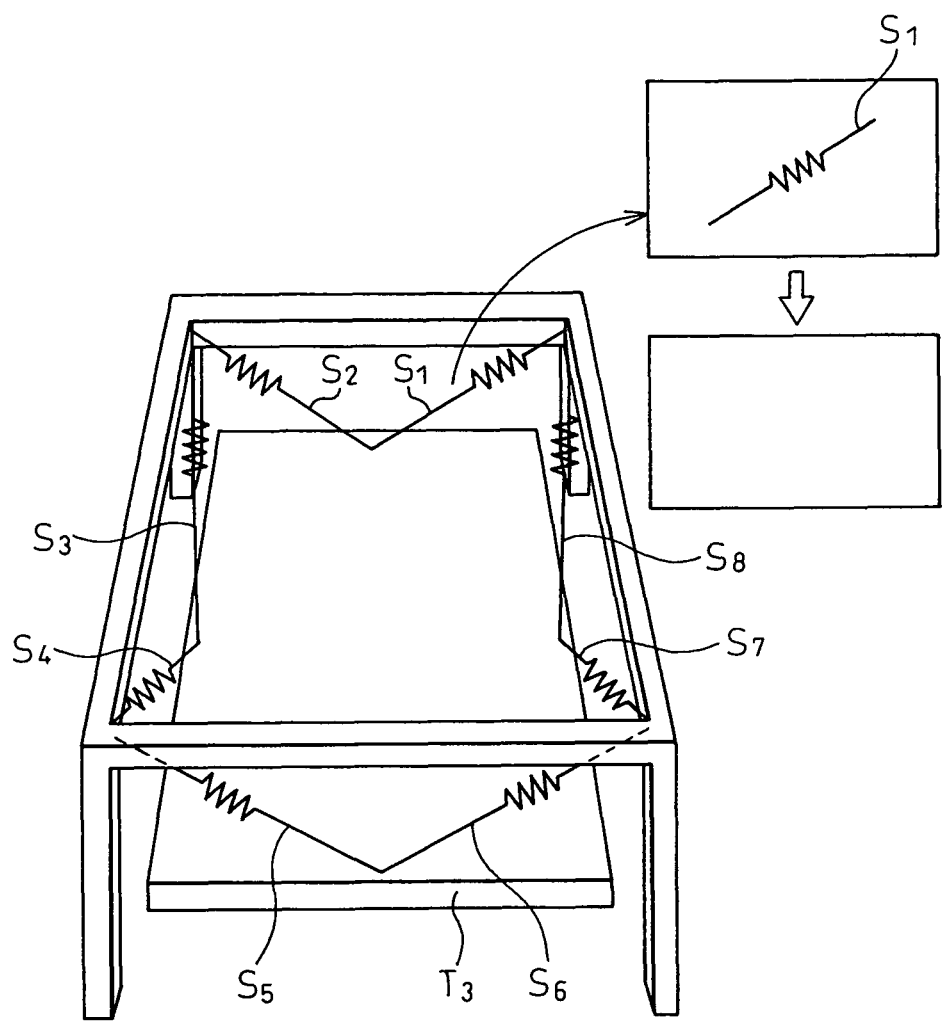
FIG. 11 is a view which shows a test state in Example 4.

Next, the measurement target, as shown in FIG. 11, is made a rectangular aluminum plate $T_3$ and the measurement target $T_3$ is directly supported by the support members without using a platform. As the support members, eight spring straps $S_1$ to $S_8$ are used. The natural frequency is measured by force sensors. The measurement conditions are changed by removing part $S_1$ of the support members. The identification results of the measurement target $T_3$ in the case of using the above-mentioned identification technique under such test conditions are shown in Table 4. The true values in Table 4 are found by calculations from the shape of the measurement target $T_3$. As will be understood from Table 4, the error of the identification results is in each case less than about 1%.

TABLE 4

Test Results of Example 4 (Relating to Plate $T_3$ of Measurement Target)

| Parameter | Unit | True value | Error g({r}) | Error h({r}) |
|---|---|---|---|---|
| m | $10^{-3}$ kg | 844.0 | −5.535 | 0.915 (0.11%) |
| $I_{xx}$ | $10^{-3}$ kgm² | 4.398 | −0.028 | 0.027 (0.60%) |
| $I_{yy}$ | $10^{-3}$ kgm² | 4.398 | −0.036 | −0.052 (1.20%) |
| $I_{zz}$ | $10^{-3}$ kgm² | 8.792 | −0.014 | −0.025 (0.28%) |
| $I_{xy}$ | $10^{-3}$ kgm² | 0 | −0.013 | −0.013 |
| $I_{xz}$ | $10^{-3}$ kgm² | 0 | 0.073 | −0.007 |
| $I_{yz}$ | $10^{-3}$ kgm² | 0 | 0.102 | 0.071 |
| $\zeta_{G,x}$ | Mm | 125.0 | 1.8 | 0.7 |
| $\zeta_{G,y}$ | Mm | 125.0 | 0.8 | 1.1 |
| $\zeta_{G,z}$ | Mm | −2.5 | −0.9 | −1.9 |

Note that, the present invention was explained in detail based on specific embodiments, but a person skilled in the art could make various changes, modifications, etc. without departing from the claims and idea of the present invention.

REFERENCE SIGNS LIST

1 rigid body characteristic identification system
10 frame (stationary part)
20 platform
21 moving part
30 support system
31 support members
32 spring
40 measurement device
50 analysis device
51 external interface part
52 removable media device
54 input device
56 output device
58 central processing unit
59 storage device
T measurement target

The invention claimed is:

1. A rigid body characteristic identification system which identifies rigid body characteristics of a measurement target including mass and center of gravity position, comprising:
   a stationary part;
   parts configured to move with respect to the stationary part and which include a measurement target;
   a supporting means for supporting the parts configured to move with respect to the stationary part in a freely vibratable manner of multi-degree of freedom;
   a measuring means for measuring data which is required for calculation of natural frequencies or natural angular frequencies of the parts configured to move with respect to the stationary part when the parts configured to move with respect to the stationary part vibrate; and
   an analyzing means for receiving as input support conditions by the supporting means and the measurement data which was measured by the measuring means and for performing processing based on these support conditions and the natural frequencies or natural angular frequencies which was calculated from the measurement data, wherein the analyzing means uses the support conditions by the supporting means and the natural frequencies or natural angular frequencies which was calculated from the measurement data as the basis to identify the rigid body characteristics of the measurement target, and wherein the analyzing means uses the measurement value co of the natural frequencies or natural angular frequencies which are measured by the measuring means at a plurality of different measurement conditions, and the rigidity matrix [K] which was calculated by the support conditions by the supporting means as the basis to identify the components of the rigid body mass matrix [M] which approximately satisfy the following formula (1) and uses the identified components of the rigid body mass matrix [M] as the basis to identify the rigid body characteristics:

$$det([M]^{-1}[K]-\omega^2[I])=0 \quad (1).$$

2. The rigid body characteristic identification system as set forth in claim 1, wherein the supporting means provides a plurality of support members which support the parts configured to move with respect to the stationary part, at least part of these plurality of support members are elastic members, and the support means are formed so that the support conditions are configured to be changed by at least one of removal of part of these plurality of support members, addition of a separate support member, change of a coefficient of elasticity of a support member comprised of an elastic member, change of a support member comprised of an elastic member to a non-elastic member, and change of a mounting position to one side or both sides of part of the support members.

3. The rigid body characteristic identification system as set forth in claim 2, wherein the rigidity matrix [K] is calculated based on coordinates of mounting positions of the support members to the parts configured to move with respect to the stationary part and the coefficient of elasticity of the support members.

4. The rigid body characteristic identification system as set forth in claim 3, wherein the rigidity matrix [K] is calculated as a function of the mass and center of gravity position of the measurement target based on coordinates of mounting positions of the support members to the parts configured to move with respect to the stationary part and a coefficient of elasticity of the support members plus mounting positions of the support members to the stationary part and a length of the support members in a natural state.

5. The rigid body characteristic identification system as set forth in claim 1, wherein the parts configured to move with respect to the stationary part are formed so that the configuration of the parts configured to move with respect to the stationary part is configured to be changed by changing the configuration of a part other than the measurement target in the parts configured to move with respect to the stationary part and by changing a position or posture of a measurement target with respect to a part other than the measurement target.

6. The rigid body characteristic identification system as set forth in claim 1, wherein the components of the rigid body mass matrix [M] which satisfy the formula (1) are identified by optimization based on the measurement value co of the natural frequencies or natural angular frequencies by the measuring means.

7. The rigid body characteristic identification system as set forth in claim 1, wherein the parts configured to move with respect to the stationary part are provided with a platform and a measurement target which is placed on the platform and wherein the supporting means supports the platform.

8. A rigid body characteristic identification method which identifies rigid body characteristics of a measurement target by a rigid body characteristic identification system comprising:

a stationary part;

parts configured to move with respect to the stationary part and which include a measurement target; and a supporting means for supporting the parts configured to move with respect to the stationary part in a freely vibratable manner of multi-degree of freedom, comprising:

a step of making the parts configured to move with respect to the stationary part freely vibrate, a step of measuring natural frequencies or natural angular frequencies of vibration of the parts configured to move with respect to the stationary part at a plurality of different measurement conditions when the parts configured to move with respect to the stationary part are freely vibrating; and a step of using support conditions by the supporting means and a measurement value of the natural frequencies or natural angular frequencies as the basis to identify the rigid body characteristics of the measurement target;

wherein the step of identifying the rigid body characteristics comprises a step of using a measurement value co of the natural frequencies or natural angular frequencies by the step of measuring the natural frequencies or natural angular frequencies and a rigidity matrix [K] which is calculated based on support conditions by the supporting means as the basis to identify components of the rigid body mass matrix [M] which substantially satisfy the following formula (2); and a step of identifying the rigid body characteristics based on the identified components of the rigid body mass matrix [M]:

$$det([M]^{-1}[K]-\omega^2[I])=0 \quad (2).$$

9. The rigid body characteristic identification method as set forth in claim 8, further comprising a step of changing measurement conditions, wherein the step of measuring natural frequencies or a natural angular frequencies is performed under at least three different measurement conditions.

10. The rigid body characteristic identification method as set forth in claim 9, wherein the measurement conditions are changed by changing the support conditions by the supporting means.

11. The rigid body characteristic identification method as set forth in claim 9, wherein the measurement conditions are changed by changing the configuration of the parts configured to move with respect to the stationary part.

* * * * *